United States Patent
Malone et al.

(10) Patent No.: US 6,185,806 B1
(45) Date of Patent: *Feb. 13, 2001

(54) METHOD OF FABRICATING A CONTROL ASSEMBLY CHOOSING FROM MULTIPLE COMPONENTS

(75) Inventors: David S. Malone, Attica; Michael R. Hall, Ortonville; Timotheye P. Tighe, Sterling Heights, all of MI (US); Jean-Francois Roy, Gatineau (CA)

(73) Assignee: Teleflex Incorporated, Plymouth Meeting, PA (US)

( * ) Notice: Under 35 U.S.C. 154(b), the term of this patent shall be extended for 0 days.

This patent is subject to a terminal disclaimer.

(21) Appl. No.: 09/241,560

(22) Filed: Feb. 1, 1999

Related U.S. Application Data

(62) Division of application No. 08/994,416, filed on Dec. 19, 1997, now Pat. No. 5,907,978.

(51) Int. Cl.$^7$ ........................................................ B23P 11/00
(52) U.S. Cl. ................................................. 29/434; 29/517
(58) Field of Search ........................................ 29/434, 517

(56) References Cited

U.S. PATENT DOCUMENTS

| | | |
|---|---|---|
| 3,390,589 | * 7/1968 | Tschanz . |
| 5,014,569 | * 5/1991 | Kelley . |
| 5,546,827 | * 8/1996 | Pospisil . |
| 5,862,580 | * 1/1999 | Petruccello et al. ............ 29/434 |
| 5,907,978 | * 6/1999 | Malone et al. . |
| 6,053,064 | * 4/2000 | Gowing et al. . |

* cited by examiner

Primary Examiner—S. Thomas Hughes
Assistant Examiner—Steven A Blount
(74) Attorney, Agent, or Firm—Howard & Howard

(57) ABSTRACT

A method of fabricating a remote control assembly having a conduit (12) movably supporting a core element (14) with an end fitting (16) disposed on the conduit (12) for mechanical engagement with a ferrule (18) and a slug (20) disposed on the core element (14). The method comprises the steps of selecting a ferrule (18) for supporting the conduit (12) on a support structure (22) from a plurality of ferrule (18) configurations and snapping the ferrule (18) into mechanical connection with the end fitting (16) while inserting the core element (14) through the conduit (12) and ferrule (18). A terminal member (38, 138, 238), having a slug pocket (40) therein and a connector for connection configurations and it is placed on the core element (14) with the slug (20) in the slug pocket (40). A collar (42) is placed over the slug pocket (40) as the collar (42) is mechanically connected to the terminal member (38, 138, 238) to cover the slug pocket (40) and retain the slug (20) in the slug pocket (40). The selection may be of a ferrule (18) having a first outside guide tube (28) and a collar (42) having a first inside guide tube (48) for telescoping relationship with the first outside guide tube (28) or, sequentially may be of a collar (42) with a second outside guide tube (50) and placing a second inside guide tube (52) to extend from the end fitting (16) for telescoping relationship with the second outside guide tube (50).

9 Claims, 2 Drawing Sheets

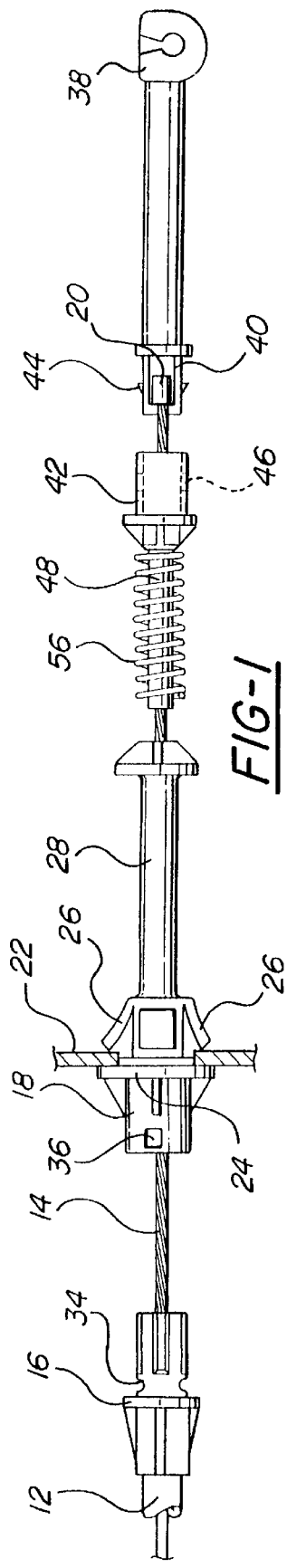
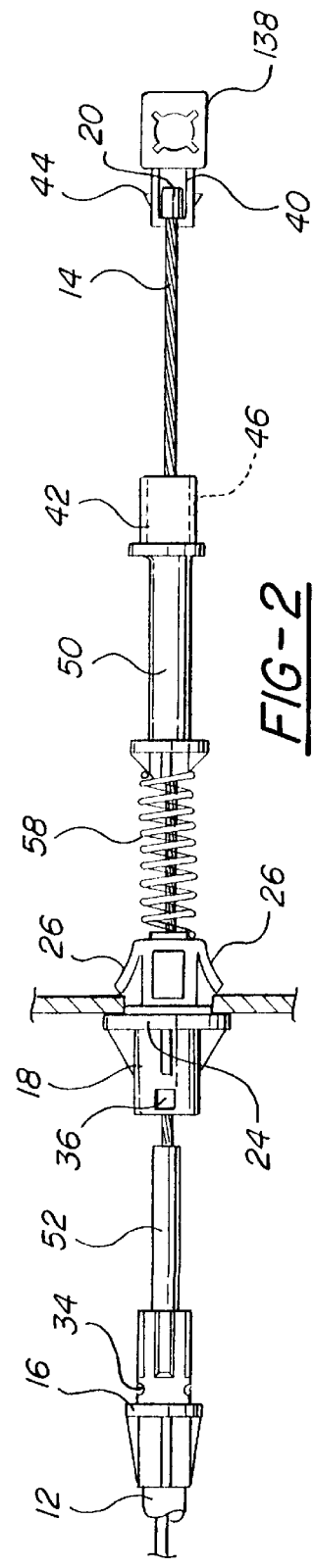
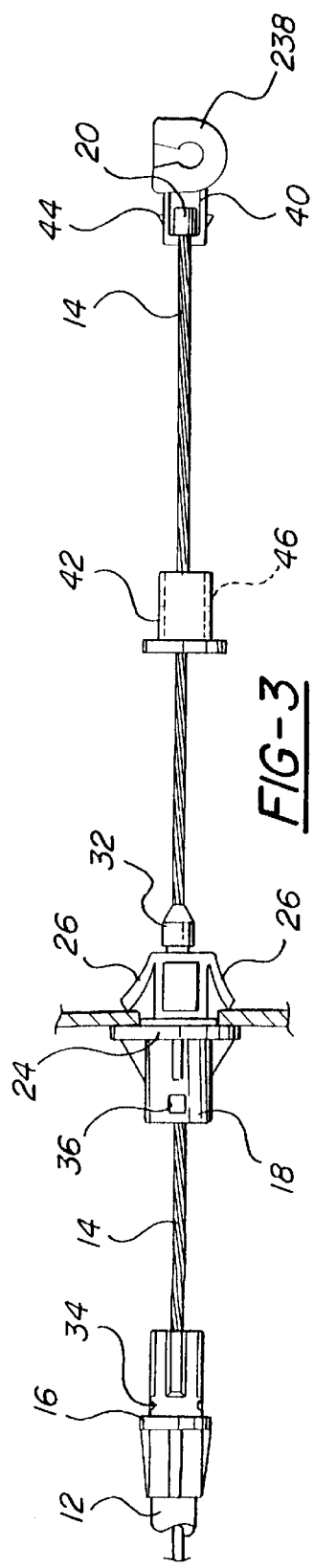

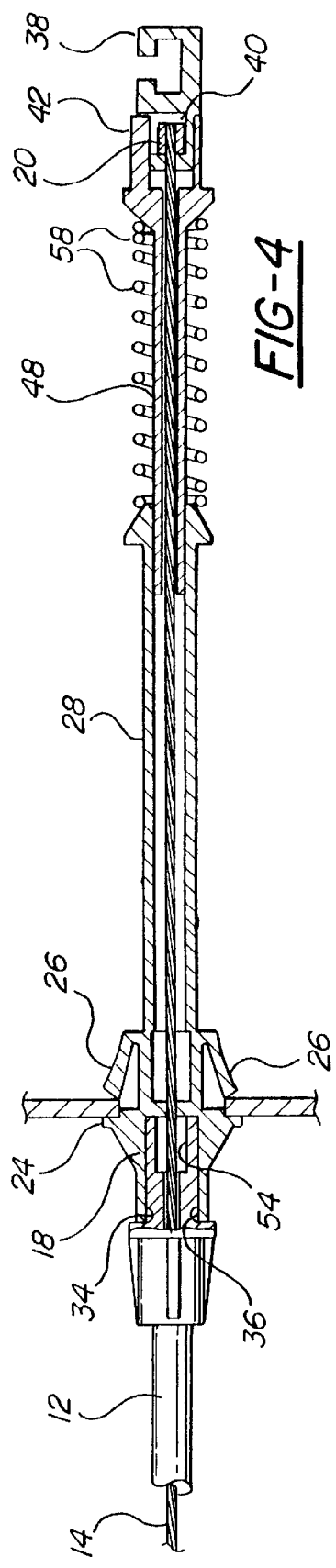
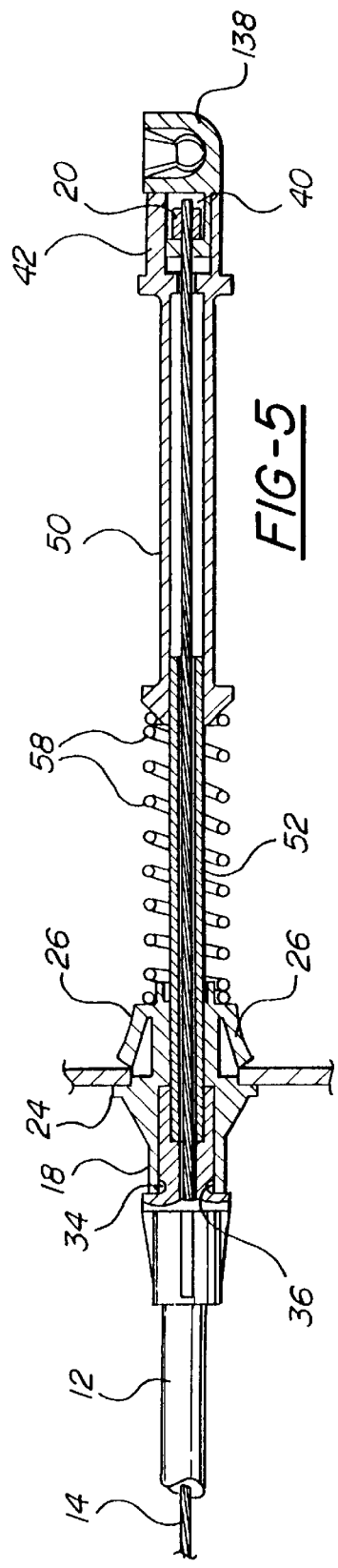
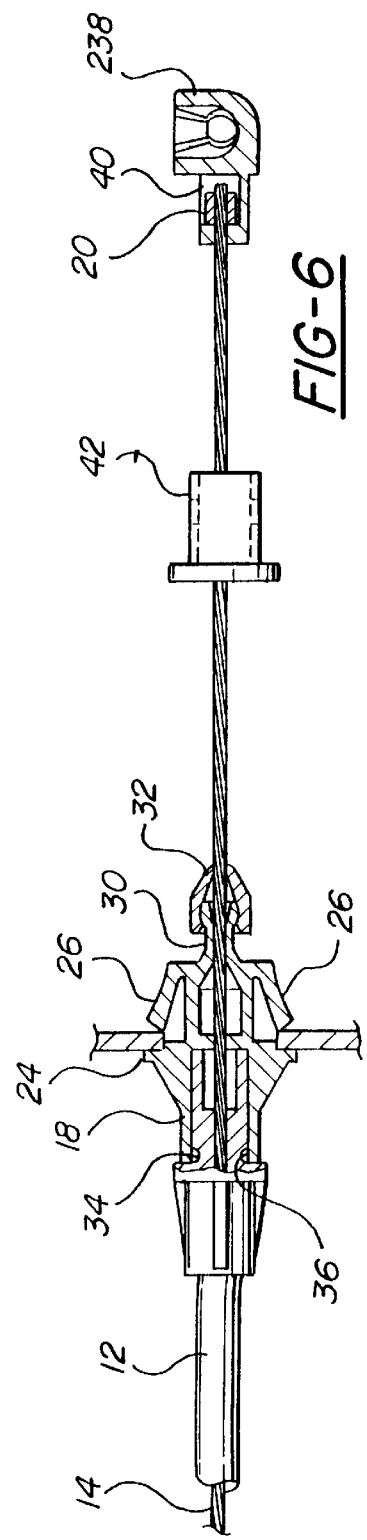

METHOD OF FABRICATING A CONTROL ASSEMBLY CHOOSING FROM MULTIPLE COMPONENTS

RELATED APPLICATION

This application is a divisional of application Ser. No. 08/994,416, filed Dec. 19, 1997, now U.S. Pat. No. 5,907,978.

BACKGROUND OF THE INVENTION

1. Field of the Invention

The subject invention relates to a motion transmitting remote control assembly of the type for transmitting motion in a curved path by a flexible motion transmitting core element movably supported in a conduit which is supported by a support structure.

2. Description of the Prior Art

Such remote control assemblies are widely used in the automotive industry for accelerators, vents, mirrors, hoods, cruise controls, etc. typically each control assembly is manufactured for a dedicated purpose and is only suitable for that dedicated installation. This requires the shipment and inventory of a large number of large and varied assemblies. There is a need, therefore, to standardize such control assemblies.

SUMMARY OF THE INVENTION AND ADVANTAGES

The invention provides a method of fabricating a remote control assembly having a conduit movably supporting a core element with an end fitting disposed on the conduit for mechanical engagement with a ferrule and a slug disposed on the core element. The method comprises the steps of: selecting a ferrule for supporting the conduit on a support structure from a plurality of ferrule configurations and mechanically connecting the ferrule to the end fitting with a core element inserted through the conduit and ferrule. Also included is the step of selecting a terminal member having a slug pocket therein and a connector for connection to a control member from a plurality of terminal member configurations and placing the terminal member on the core element with the slug in the slug pocket.

The method, therefore, provides such an assembly wherein the ferrule is mechanically connected to the end fitting and is adapted for attachment to a support structure, the terminal member has a slug pocket and is adapted for connection to a control member, and the slug is connected to the core element and is disposed in the slug pocket of the terminal member whereby the ferrule may be selected from a plurality of ferrules each having a different configuration and the terminal member may be selected from a plurality of terminal members each having a different configuration.

Accordinglky, various combinations of remote control assemblies may be fabricated from a standardized or universal conduit and end fitting by selecting from various components thereby reducing the need for a wide variety of total remote control assemblies including dedicated conduits and end fittings to satisfy a wide variety of environments.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side elevational view of a first combination of components;

FIG. 2 is a side elevational view of a second combination of components;

FIG. 3 is a side elevational view of a third combination of components;

FIG. 4 is a cross sectional view of the combination of FIG. 1 in the fully assembled condition;

FIG. 5 is a cross sectional view of the combination of FIG. 2 in the fully assembled condition; and FIG. 6 is a cross sectional view of the combination of FIG. 3 in the fully assembled condition.

DETAILED DESCRIPTION OF THE PREFERRED EMBODIMENT

Referring to the Figures, wherein like numerals indicate like or corresponding parts throughout the several views, a method of fabricating a remote control assembly is illustrated. The remote control assembly includes a conduit 12 for movably supporting a core element 14. A universal end fitting 16 is disposed on the conduit 12 for mechanical engagement with a ferrule 18 and a slug 20 is disposed on the core element 14. The core element 14 is made of metal wire or metal filaments stranded together. The conduit 12 is of the well type comprising an inner liner of organic polymeric material surrounded by a wire or filaments disposed on a long helical lead and surrounded by a casing of organic polymeric material.

The method of fabricating the remote control assembly includes the step of selecting a ferrule 18 for supporting the conduit 12 on a support structure 22 from a plurality of ferrule 18 configurations. The ferrule 18 body is the same in all configurations by including a cylindrical portion molded of organic polymeric material so as to be diffused with the organic polymeric material of the conduit 12 and expanding into a flange 24 for engaging one side of the support structure 22 about an aperture therein and a pair of cantilevered tabs 26 for engaging the opposite side of the support structure 22 about the aperture therein. This is the totality of the ferrule 18 used in the combination of FIGS. 2 and 5; however, the ferrule 18 of FIGS. 1 and 4 includes an outside guide tube 28 formed integrally therewith and extending along the longitudinal axis, and the ferrule 18 of FIGS. 3 and 6 includes a projection 30 upon which is snapped a wiper 32. The wiper 32 slidably engages the core element to keep water and other contaminants out of the assembly.

The exterior of the end fitting 16 and the interior of the cylindrical portion of the ferrule 18 include a tongue and groove connection between the ferrule 18 and end fitting 16 for mechanically connecting the ferrule 18 to the end fitting 16 whereby the ferrule 18 may rotate about the longitudinal axis of the of the conduit 12 relative to the fitting 16. The end fitting 16 presents a groove 34 into which is snapped a tongue 36 which extends inwardly from the interior of the cylindrical portion of the ferrule 18. Upon selection of the ferrule 18, the next step is to mechanically connect the ferrule 18 to the end fitting 16 by snapping the tongue 36 into the groove 34. The mechanical connection is therefore further defined as rotatably connecting the ferrule 18 to the end fitting 16 so that the ferrule 18 is free to rotate about the longitudinal axis of the conduit 12 relative to the end fitting 16. The core element 14 is inserted through the conduit 12 and the ferrule 18.

The method includes the step of selecting a terminal member from a plurality of terminal member configurations.

The first terminal member configuration is shown at 38 in FIGS. 1 and 4, a second at 138 in FIGS. 2 and 5, and a third at 238 in FIGS. 3 and 6. Each terminal member 38, 138, 238 presents a slug pocket 40 therein for receiving the slug 20 with the core element 14 extending through a slot in the end wall of the slug pocket 40. Thus, the terminal member 38, 138, 238 is placed on the core element 14 by inserting the core element 14 into the slot as the slug 20 is deposited in the slug pocket 40. Each terminal member 38, 138, 238 also has a connector for connection to a control member; however, this connector is selected from a plurality of different configurations. Any one of the terminal members 38, 138, 238 may have either a connector presenting a pocket for receiving a nail head shaped control member, as shown in terminal members 38 and 238 or a connector presenting a pocket for receiving a ball shaped control member, as shown in the terminal member 138. Therefore, the selection of the terminal member 38, 138, 238 is further defined as further defined as selecting a terminal member 38, 238 having a connector for connection to a nail head shaped control member and sequentially selecting a terminal member 138 having a ball shaped control member.

The method also includes the step of placing a collar 42 over the slug pocket 40 and mechanically connecting the collar 42 to the terminal member 38, 138, 238 to cover the slug pocket 40 and retain the slug 20 in the slug pocket 40. The terminal member 38, 138, 238 presents projections 44 which snap into holes 46 in the collar 42 for mechanically connecting the collar 42 to the terminal member 38, 138, 238. The collar 42 is selected from a plurality of different configurations. The configuration of FIGS. 1 and 4 includes an inside guide tube 48 formed integrally therewith, whereas the collar 42 of FIGS. 2 and 5 includes an outside guide tube 50 formed integrally therewith, and the collar 42 of FIGS. 3 and 6 has no such tubular extension. In the combination of FIGS. 2 and 5, an inside guide tube 52 is inserted into a counterbore 54 in the end fitting 16 with one end of the inside guide tube retained in the counterbore and extending from the end fitting 16 for telescoping relationship with the outside guide tube 50. The inside guide tube 52 may be press fit or adhesively secured in the counterbore.

Accordingly, the selecting is further defined as selecting a first combination including a ferrule 18 having a first outside guide tube 28 and a collar 42 having a first inside guide tube 48 for telescoping relationship with the first outside guide tube 28 sequentially with selecting a second combination including a collar 42 with a second outside guide tube 50 and placing a second inside guide tube 52 to extend from the end fitting 16 for telescoping relationship with the second outside guide tube 50. The selection will depend upon whether the routing is upward, whereupon the combination of FIGS. 2 and 5 will be selected to keep water out of the assembly, or downward, whereupon the combination of FIGS. 1 and 4 will be selected. The combination of FIGS. 3 and 6 could be used in various orientations. The method also includes the step of placing a spring between the collar 42 and the ferrule 18 to urge the telescoping relationship therebetween in the extending direction. More specifically, in the combination of FIGS. 1 and 4, the spring 56 is coiled about the inside guide tube 48 between the end 30 of the outside guide tube 28 and the collar 42 whereas the spring 58 in the combination of FIGS. 2 and 5 is coiled about the inside guide tube 52 between the ferrule 18 and the outside guide tube 50. The springs 56 and 58 urge the telescoping relationship between the outside 28 and 50 and inside guide tubes 48 and 52 in the extending direction, i.e., to increase the overall combined length.

Accordingly, during the assembly or fabrication process, various combinations may be selected; the combination may be one where the outside guide tube 28 extends from the ferrule 18 or the inside guide tube 52 extends from the ferrule 18 as it is supported by the end fitting 16. Furthermore, the terminal member 38, 138, 238 may, within the above varied combinations, also vary between a nail head pocket or a ball pocket, and with different distances between the pocket and the collar 42, as is clear by comparing FIGS. 1 and 2.

The invention, therefore, provides a motion transmitting remote control assembly comprising a conduit 12 having first and second ends with a universal end fitting 16 disposed on the first end of the conduit 12 and the core element 14 is movably supported in the conduit 12 and extends from the first and second ends of the conduit 12. The ferrule 18 is mechanically connected to the end fitting 16 and is adapted for attachment to a support structure 22. More specifically, a tongue 36 and groove 34 connection is disposed between the ferrule 18 and the end fitting 16 for rotatably connecting the ferrule 18 to the end fitting 16 whereby the ferrule 18 may rotate about the longitudinal axis of the conduit 12 relative to the end fitting 16. The terminal member 38, 138, 238 has a slug pocket 40 and is adapted for connection to a control member and the slug 20 is connected to the core element 14 and is disposed in the slug pocket 40 of the terminal member 38, 138, 238 whereby the ferrule 18 may be selected from a plurality of ferrules 18 each having a different configuration and the terminal member 38, 138, 238 may be selected from a plurality of terminal members 38, 138, 238 each having a different configuration. The ferrule 18 includes a flange 24 for engaging one side of a support structure 22 about an aperture therein and a pair of flexible tabs 26 for engaging the opposite side of the support structure 22 about the aperture therein. The body of the ferrule 18 may be round to engage a circular aperture or rectangular to engage a four sided aperture.

The collar 42 is mechanically connected to the terminal member 38, 138, 238 and is disposed over the slug pocket 40 to retain the slug 20 in the slug pocket 40. The outside guide tube 28 and 50 extends from one of the ferrule 18 and the collar 42 and an inside guide tube extends from one of the end fitting 16 and the collar 42 for telescoping relationship of the tubes. The spring is disposed between the collar 42 and the ferrule 18 to urge the telescoping relationship in the extending direction.

As alluded to above, the end fitting 16 includes a counterbore and the inside guide tube 52 is retained in the counterbore and extends therefrom, the outside tube 50 extending from the collar 42 and in the telescoping relationship with the inside tube 52. Also as alluded to above, the terminal member 38, 138, 238 has a connector for receiving one of a nail shaped control member and a ball shaped control member.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of fabricating a remote control assembly having a conduit (12) movably supporting a core element (14) with an end fitting (16) disposed on the conduit (12) for mechanical engagement with a ferrule (18) and a slug (20) disposed on the core element (14), said method comprising the steps of:

selecting a ferrule (18) for supporting the conduit (12) on a support structure (22) from a plurality of ferrule (18) configurations;

mechanically connecting the ferrule (18) to the end fitting (16);

inserting the core element (14) through the conduit (12) and ferrule (18);

selecting a terminal member (38, 138, 238) having a slug pocket (40) therein and a connector for connection to a control member from a plurality of terminal member (38, 138, 238) configurations; and placing the terminal member (38, 138, 238) on the core element (14) with the slug (20) in the slug pocket (40).

2. A method as set forth in claim 1 including placing a collar (42) over the slug pocket (40) and mechanically connecting the collar (42) to the terminal member (38, 138, 238) to cover the slug pocket (40) and retain the slug (20) in the slug pocket (40).

3. A method as set forth in claim 2 wherein the selecting is further defined as selecting a ferrule (18) having a first outside guide tube (28) and a collar (42) having a first inside guide tube (48) for telescoping relationship with the first outside guide tube (28) sequentially with selecting a collar (42) with a second outside guide tube (50) and placing a second inside guide tube (52) to extend from the end fitting (16) for telescoping relationship with the second outside guide tube (50).

4. A method as set forth in claim 3 further including placing a spring between the collar (42) and the ferrule (18) to urge the telescoping relationship therebetween in the extending direction.

5. A method of fabricating a remote control assembly having a conduit (12) movably supporting a core element (14) with an end fitting (16) disposed on the conduit (12) for mechanical engagement with a ferrule (18) and a slug (20) disposed on the core element (14), said method comprising the steps of rotatably connecting the ferrule (18) to the end fitting (16) so that the ferrule is free to rotate about the longitudinal axis of the conduit (12) relative to the end fitting (16);

inserting the core element (14) through the conduit (12) and ferrule (18);

selecting a terminal member (38, 138, 238) having a slug pocket (40) therein and a connector for connection to a control member from a plurality of terminal member (38, 138, 238) configurations; and placing the terminal member (38, 138, 238) on the core element (14) with the slug (20) in the slug pocket (40).

6. A method as set forth in claim 5 including placing a core element wiper (32) on the ferrule (18) to slidably engage the core element (14).

7. A method as set forth in claim 5 further defined as selecting a ferrule (18) which includes a flange (24) for engaging one side of a support structure (22) about an aperture therein and a pair of flexible tabs (26) for engaging the opposite side of the support structure (22) about the aperture therein.

8. A method as set forth in claim 3 further defined as inserting the second inside guide tube (52) into the end fitting (16) for retention therein.

9. A method as set forth in claim 2 further defined as selecting the terminal member (38, 138, 238) from the plurality of terminal members (38, 138, 238) by selecting a terminal member (38, 138, 238) having a connector for connection to a nail head shaped control member and sequentially selecting a terminal member (38, 138, 238) having a ball shaped control member.

* * * * *